Jan. 23, 1951 — L. M. HARVEY ET AL — 2,538,835
FLUID HANDLING DEVICE
Filed Oct. 16, 1946 — 3 Sheets-Sheet 1
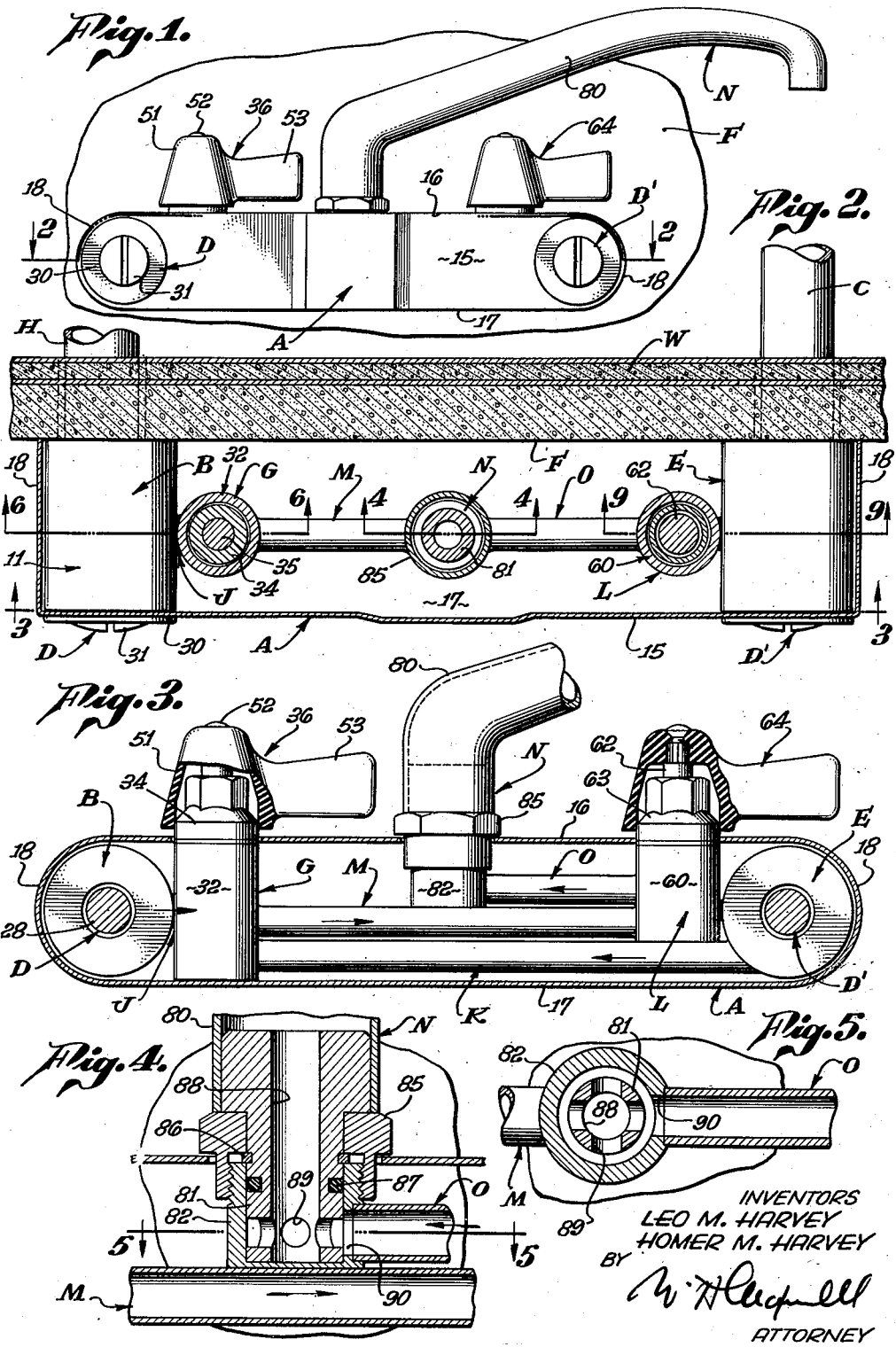
INVENTORS
LEO M. HARVEY
HOMER M. HARVEY
BY
ATTORNEY

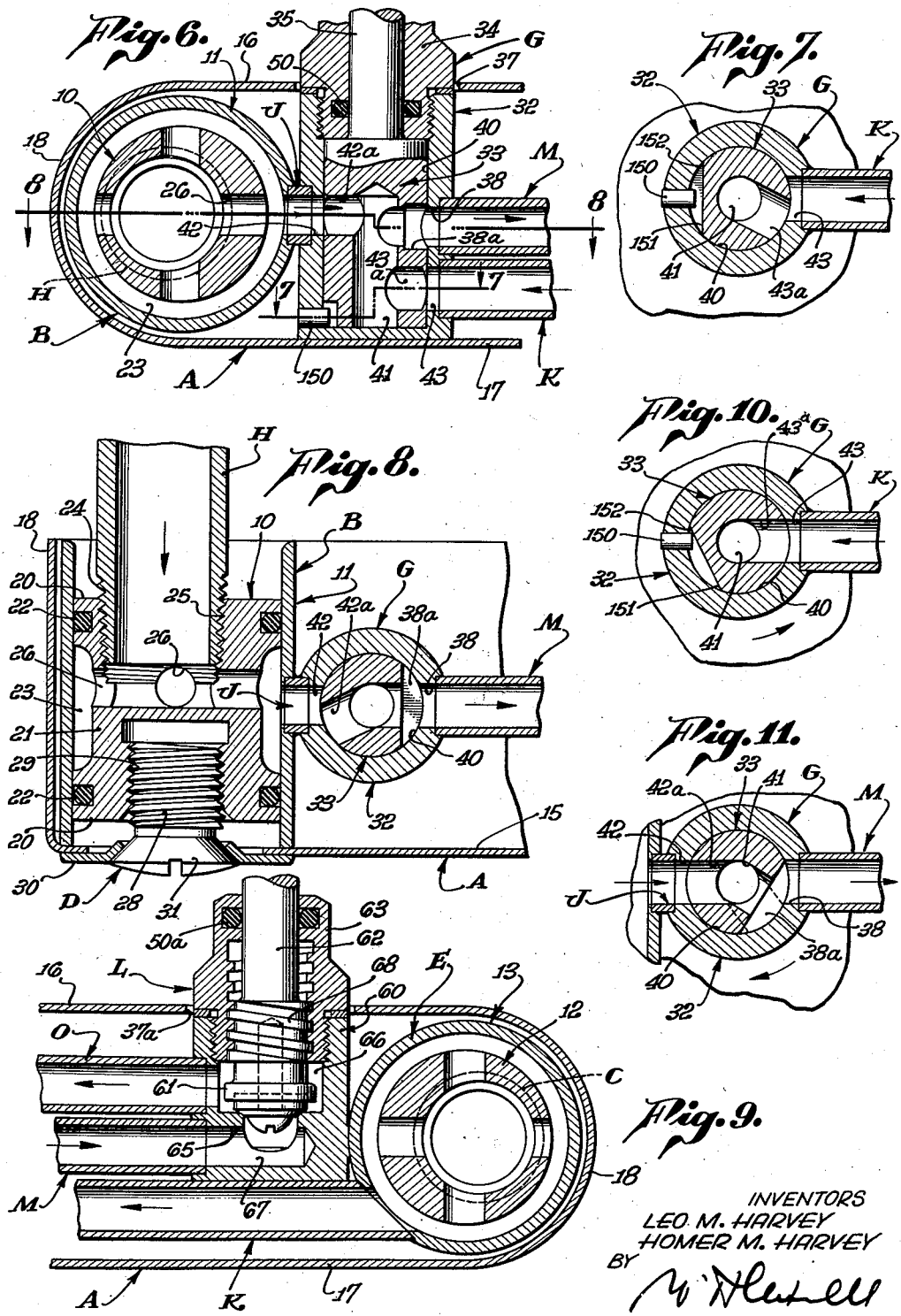

Jan. 23, 1951 L. M. HARVEY ET AL 2,538,835
FLUID HANDLING DEVICE
Filed Oct. 16, 1946 3 Sheets-Sheet 3
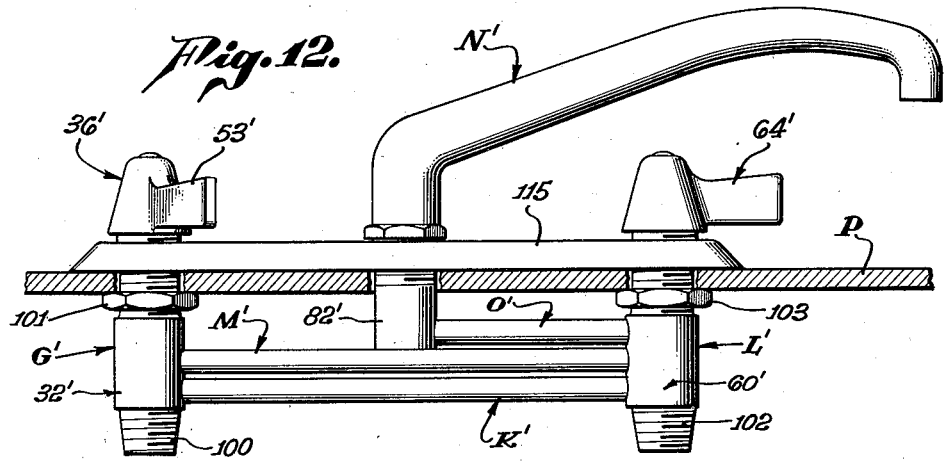
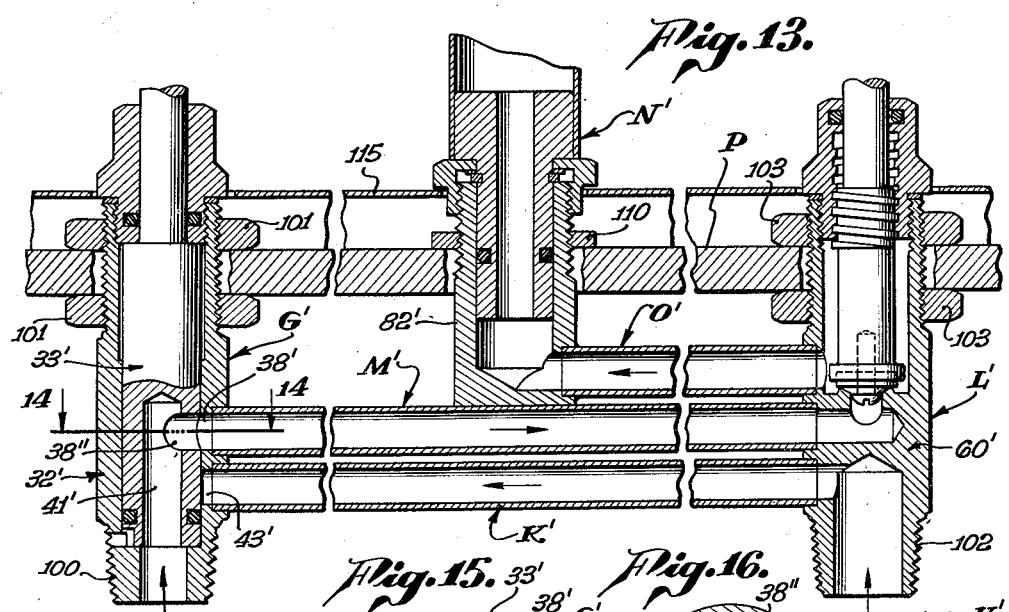
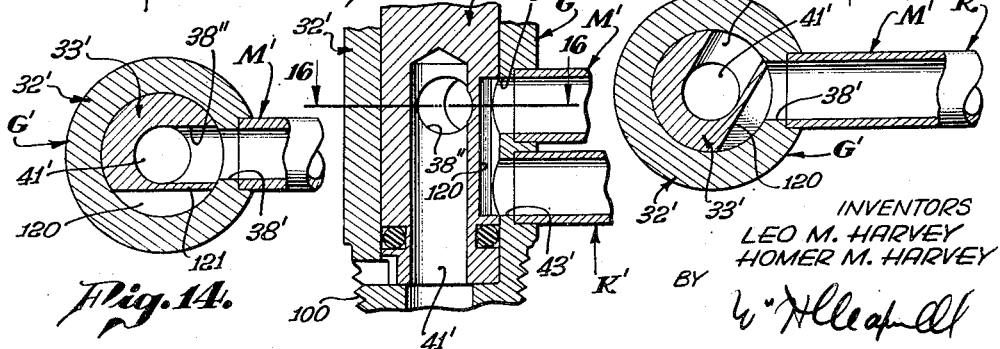
INVENTORS
LEO M. HARVEY
HOMER M. HARVEY
BY
ATTORNEY Patented Jan. 23, 1951

2,538,835

UNITED STATES PATENT OFFICE 2,538,835

FLUID HANDLING DEVICE

Leo M. Harvey and Homer M. Harvey,
Los Angeles, Calif.

Application October 16, 1946, Serial No. 703,572

1 Claim. (Cl. 285—96.3)

This invention relates to a fluid handling device, it being a general object of the invention to provide a device suitable for use in connection with plumbing fixtures such as a sink, tub, or basin, and which is supplied with fluid from a plurality of conduits or supply pipes, that is operable to mix such fluids in any desired proportion under control of a flow regulator.

It is common, where fixtures such as sinks, tubs, or basins are employed, to pipe both hot and cold water to the fixture and then to provide faucets individually controlling the hot and cold water and, in some cases, delivering the water from both faucets through a single spout. Installations of this character are not altogether satisfactory in that it is difficult to obtain the desired amount of flow at the desired temperature, since to get the desired flow at the desired temperature it is necessary to regulate the faucets to adjust both of these factors. Furthermore, where faucets are incorporated into a unit difficulty is encountered in installation if the supply lines or pipes have not been accurately positioned, and further, such unitary devices, when provided, generally involve complicated castings and are expensive and difficult of manufacture.

A general object of this invention is to provide a flow handling device applicable to supply pipes, as for instance, a hot water pipe and a cold water pipe, and including a mixing or regulating valve that can be easily set or adjusted to gain any desired mixture of hot and cold water, and further including a flow control valve which is conveniently operable to gain any desired flow of the mixture for which the regulating valve is set. With the structure of the present invention, where a predetermined mixture of hot and cold water is desired, the mixing or regulating valve can be set to deliver effectively the proper mixture and can thereafter be left in that position while the control valve is opened and closed at will.

It is a further object of the present invention to provide a device of the general character referred to involving unique couplers by which the device is connected with supply pipes and which are adjustable or variable to compensate for misalignment or improper positioning of the supply pipe.

Another object of the present invention is to provide a flow handling device of the general character referred to wherein a plurality of fixed parts including the essential fixed parts of the structure are formed separately and in a most economical manner and are permanently assembled by brazing to form a permanent rigid integral unit. In the preferred form of the invention the several principle fixed parts are individually formed, utilizing a minimum amount of material, and when fully assembled they are joined or united by furnace brazing.

The various objects and features of our invention will be fully understood from the following detailed description of typical preferred forms and applications of our invention, throughout which description reference is made to the accompanying drawings, in which:

Fig. 1 is a front elevation of a typical form of device provided by this invention. Fig. 2 is an enlarged plan section taken substantially as indicated by line 2—2 on Fig. 1. Fig. 3 is a sectional view taken substantially as indicated by line 3—3 on Fig. 2, showing parts of the operating members broken away to illustrate the construction. Fig. 4 is an enlarged detailed sectional view taken as indicated by line 4—4 on Fig. 2. Fig. 5 is a plan section taken as indicated by line 5—5 on Fig. 4. Fig. 6 is an enlarged detailed sectional view taken as indicated by line 6—6 on Fig. 2. Fig. 7 is a plan section taken as indicated by line 7—7 on Fig. 6. Fig. 8 is an enlarged detailed sectional view taken as indicated by line 8—8 on Fig. 6. Fig. 9 is an enlarged detailed sectional view taken as indicated by line 9—9 on Fig. 2. Fig. 10 is a view similar to Fig. 7 showing the ports illustrated therein fully registered, and Fig. 11 is a view similar to a portion of Fig. 8 showing the ports illustrated therein fully registered. Fig. 12 is a view illustrating a modified form of the invention showing the manner in which it is applicable to a fixture. Fig. 13 is an enlarged detailed sectional view of the structure shown in Fig. 12. Fig. 14 is an enlarged plan section taken as indicated by line 14—14 on Fig. 13. Fig. 15 is a vertical or longitudinal sectional view of part of the structure illustrated in Fig. 14, and Fig. 16 is a sectional view taken as indicated by line 16—16 on Fig. 15.

The fluid handling device of the present invention is applicable to a hot water supply pipe H and a cold water supply pipe C and it may be mounted on a wall or in a suitable part of a fixture so that it is operable to deliver fluid in the desired manner. In Figs. 1 and 2 of the drawings one form of the invention is shown carried by pipes H and C in the face F of a wall W, which wall may be considered as occurring behind a fixture such as a tub, basin or bowl, whereas in Figs. 12 and 13 of the drawings we show a form of the invention applied to a panel P which may be a part of a tub, bowl or fixture. In the latter application the device may be supported partially or wholly by the fixture and does not depend upon the supply pipes for support.

The form of the invention which is illustrated in Figs. 1 to 11, inclusive, involves, generally, a housing A, a coupler B including a part 10 applicable to a supply pipe such as the hot water pipe H, and a part 11 carrying the part 10 and carried by the housing A, means D releasably connecting the housing A and the part 10 of means B, a coupler E including a part 12 applicable to a supply pipe such as a cold water pipe C, and a part 13 carrying the part 12 and carried by the housing A, means D' releasably connecting the housing A and the part 12 of means E, a mixing valve G carried by the housing, a conduit J conducting fluid from coupler B to the mixing valve G, a conduit K conducting fluid from the coupler E to the mixing valve G, a control valve L carried by the housing A, a conduit M conducting fluid from the mixing valve G to the control valve L, a delivery spout N carried by the housing and a conduit O conducting fluid from the control valve L to the spout N.

The housing A when provided is preferably a shell-like element or structure housing or supporting the various other elements of the device. In the particular form of the invention shown in the drawings the housing A is an elongate shell-like structure designed to be arranged horizontally and against the face F of a wall W. In the drawings the housing is shown as including a front 15, top and bottom sides 16 and 17, respectively, and ends 18. The coupler B and the releasable connecting means D are shown located at the lefthand end portion of the housing while the coupler E and the releasable connecting means D' are shown located at the righthand end portion of the housing A. The spout N is located midway between the ends of the housing.

The particular housing construction of the present invention is simple and inexpensive of construction and is open at the back which fits against the wall W so that its interior is readily accessible to enable the various other elements to be assembled into it as will be hereinafter described.

The coupler B located at one end of the housing A serves as a means for mounting the device or for securing it in the desired position relative to the wall W or the like, and it also serves as a fluid connection between the hot water supply pipe H and the conduit J which extends to the mixing valve G. Part 11 of the coupler B is in the form of a cylindrical case fixed in the housing to extend from the front wall 15 thereof rearwardly in the housing to the back thereof, where it is open. The forward end of the cylindrical case 11 is fixed or made secure to the front 15 of the housing A by the brazing operation hereinafter described. The conduit J extends between or connects the coupler B and the mixing valve G and where these elements are located close to each other, as illustrated in Figs. 6 and 8 of the drawings, the conduit J may be a short part in the nature of a nipple, and may, if desired, be formed integral with or as a part of either the coupler or the mixing valve. In the drawings the conduit J is shown as a separate or individual part inserted between the coupler and the mixing valve and it is bonded or integrally joined with the coupler and mixing valve by the brazing operation hereinafter described. In accordance with our arrangement of parts the conduit J connects into one side of the cylindrical case 11 at a point about midway between the ends of the case.

The part 10 of means B is applicable to the supply pipe H and is carried in the case 11. The part 10 is in the nature of a plug fitting snugly in the case 11 and in its preferred form it is in the nature of a spool having heads 20 at its ends joined by a central or middle portion 21 of reduced diameter. The heads of the member 10 slidably fit the case 11 and are sealed therein by suitable sealing rings 22, the fit and sealing rings being such as to allow the member 10 to be freely rotated in the case 11 while a tight sealing engagement is maintained between the parts. The reduced middle portion 21 of the member 10 extending between the heads 20 forms an annular chamber 23 within the case 11 and the parts are related and proportioned so that the chamber 23 is in communication with the conduit J which connects into the side of the case 11.

The plug member 10 of the means B is intended to be connected to or applied to the end of the supply pipe H and since the supply pipe H will ordinarily be provided at its end with threads 24 we prefer to provide a threaded socket 25 in the rear end of the member 10 to receive the threaded end of pipe H. The plug member 10 is ported to connect the inner end of the threaded socket 25 with the chamber 23 and to assure free flow we preferably provide a plurality of radial ports 26 connecting the inner end of the socket 25 with the chamber 23.

In accordance with our invention the socket 25, which receives the pipe H, is not formed concentric with the plug 10 or the case 11, but rather is offset or formed eccentric to these parts, making it possible to shift the position of the housing A relative to the pipe H by turning the plug 10 in the case 11. In applying the plug 10 of means B to the pipe H a suitable tool or wrench is preferably applied to the middle portion 21 of the plug so that the head ends are not mutilated and the plug is rotated to a position on the end of the pipe H where it properly registers with the case 11 which is fixed in the housing A.

The releasable connecting means D serves to connect the plug 10 with the housing A. The means D involves primarily a clamp screw having a shank 28 threaded into a socket 29 formed in the outer end of plug member 10 of means B. In the form of the invention illustrated the means D includes a clamp plate 30 engaged by the head 31 of the screw and bearing on the front face of the front 15 of housing A. It will be apparent that when the plug part 10 of means B has been applied to the pipe H and the housing has been manipulated so that the plug 10 slides into the case 11, as shown in Fig. 8, the screw of means D can be applied to clamp the housing inwardly or rearwardly so that it bears firmly against the face F of wall W.

The coupler E provided at the other end of the housing A serves to connect the device to the supply pipe C and also serves as a conductor carrying fluid from the pipe C to the conduit K which extends from the coupler E to the mixing valve G. The means E corresponds in form and construction with the means B hereinabove described in detail, the part 12 corresponding to part 10 and the part 13 corresponding to part 11. The conduit K connects into the side of the part 13 intermediate its ends like conduit J connects into the side of part 11, except that conduit K instead of being located midway between the top and bottom of the housing A is located adjacent or close to the bottom 17 of housing A, as clearly shown in Fig. 9 of the drawings.

The releasable connecting means D' that couples the housing to the means E by connecting the front 15 of the housing to the plug part 12 of means E corresponds in construction and operation with the means D hereinabove described.

The mixing valve G includes, generally, a body 32, a core 33 rotatable in the body, a cap 34 applied to the outer or open end of the body, a stem 35 projecting from the core to extend through the cap and an operating member 36 on the outer end of the stem. In accordance with the preferred arrangement of parts the body 32, which is an elongate cylindrical part rotatably carrying the plug 33 is preferably arranged to extend vertically or so that its axis extends in a direction at right angles to those of the couplers hereinabove described.

The body 32 of the valve is preferably carried by the housing A by being made secure to or by being bonded to the bottom 17 of the housing A while the upper end of the body 32 is free of the housing and is in register with an opening 37 in the top 16 of the housing. The conduit J connects into one side of the body 32 through an inlet port 42 at a point about midway between the ends of the body and an outlet port 38 is provided in the body 32 at a point diametrically opposite the point where the conduit J connects into the body. The conduit M connects with port 38 and extends to the control valve L. The conduit K delivering fluid from means E connects into the side of the body below the port 38 through an inlet port 43 as clearly illustrated in Fig. 6 of the drawings.

The core 33 of the mixing valve G is rotatably supported in the bore or opening 40 of the body and it is shaped or ported to provide the desired communication between the conduits that connect with the body. The valve includes stop means limiting rotation of the core in the body. The stop means shown in the drawings involves a stop pin 150 carried by the body to project into the bore thereof and a recess in the side of the core opposite the stop pin forming stop shoulders 151 and 152 which cooperate with the pin. In the case illustrated the core 33 has a central opening or chamber 41, an inlet port 42ª located to cooperate with port 42, an inlet port 43ª located to cooperate with port 43, and an outlet port 38ª located to cooperate with port 38. The ports 42ª, 43ª and 38ª are all in communication with chamber 41 so that they are interconnected thereby.

The port 38ª is of substantial extent circumferentially of the plug so that it is at all times in communication with outlet port 38. Ports 42ª and 43ª are angularly related, as will be seen from a comparison of Figs. 7 and 8 of the drawings, so that when the plug is positioned as shown in Figs. 7 and 8 of the drawings each is in communication with its corresponding inlet port. When the plug is rotated clockwise from the position illustrated port 43ª moves to cut out flow from port 43 while port 42ª moves to increase flow from port 42, and when port 42ª is in full communication with port 42, port 43ª is cut off from port 43. When the plug is rotated in the opposite direction the reverse is true, that is, flow is increased between ports 43ª and 43 until there is full flow while ports 42ª and 42 are closed down until flow is fully cut off. It will thus be apparent that by rotating the plug 33 to the proper rotative position in the body 32 we are able to gain any desired mixture of hot water from conduit J with cold water from conduit K. The mixture of hot and cold water is always free to pass out of the valve G through the port 38 to be conducted by conduit M to the control valve L.

The cap 34 of valve G is threaded or otherwise secured to the outer or open end of the body 32 to retain the plug in the body and the stem 35 passes through the cap and is sealed therewith by a suitable sealing ring 50. The operating member 36 provided on the stem 35 includes a nose-shaped part 51 secured to the outer end of the stem by a screw 52 or the like, and a handle 53 projecting from the part 51, as clearly shown throughout the drawings.

The control valve L is fixed in the housing A by being carried by and bonded to conduits K, M and O, and also to the case 13 of means E, as clearly shown in Fig. 9 of the drawings. The valve L includes a body 60 disposed relative to means E in the same manner that valve G is disposed relative to means B, and a closure 61 operable in the body 60 and carried by a stem 62 projecting through a cap 63 provided on the body. The stem 62 carries an operating member 64.

The body 60 is designed to handle flow between conduits M and O and has a transverse partition 65 which divides it into upper and lower chambers 66 and 67, respectively. The lower chamber 67 is in communication with conduit M while the upper chamber is in communication with conduit O. The closure 61 is carried on the inner end of stem 62 to cooperate with the partition 65 and the stem 62 has a suitable thread 68 operating in the cap 63 so that when the stem is rotated the closure 61 is moved relative to the partition 65. The stem can be rotated so that the closure engages the partition and shuts off all flow through the valve L, or it can be lifted to any desired position above the partition to allow the desired amount of flow through the valve L. The upper end of body 60 is free and registers with an opening 37ª similar to opening 37 above described, and the cap 63 carries a sealing ring 50ª sealing around the stem 62. The operating member 64 for valve L may be of the same form or construction as that employed in connection with the valve G above described.

The delivery spout N is located midway between the valves G and L and in the form illustrated it involves a tubular duct or spout proper 80 having an extension 81 at its inner end rotatably carried in a holder 82 fixed in the housing A. The spout 80 can be of any suitable length and may be shaped in any suitable manner, a conventional spout being shown in the drawings. The holder 82 is a cylindrical part fixed in the body A by being bonded to the conduits O and M and it is closed at its lower end, its upper end being open to receive the extension 81. A sleeve 85 is rotatably carried on the extension where it is retained by a snap ring 86 and threads onto the holder 82 to retain the extension 81 in the holder. A sealing ring 87 is provided to seal the extension 81 with the holder. The extension 81 has a central fluid passage 88 in communication with the spout and a plurality of radial outlet ports 89 are provided in the extension 81 communicating with an inlet port 90 in the holder 82. The conduit O is connected with the holder 82 to be in communication with the inlet port 90.

In accordance with our present invention the various parts above described are formed separately and in the most advantageous and economical manner. For instance, many of the parts may be screw machine products and the conduits referred to may be simple lengths of tubing. We establish the principal fixed parts as a rigid or integral unit by assembling them together in the housing A with suitable bonding material at the points where they are to be connected and we then subject the assembled structure to heat treatment commonly known as furnace brazing. Through this construction we bond the parts 11 and 13 of means B and E to the housing A while the conduits are bonded to the parts that they connect with, that is, conduit J is bonded to part 11 and body 32 while conduits K and M are bonded to body 32 and also to body 60. Body 32 is bonded to the bottom 17 of the housing while body 60 is bonded to conduit K and member 13, the holder 82 being bonded to conduit M and to the conduit O which is also bonded to body 60.

By employing furnace brazing in the manner above described we join the parts mentioned in an effective dependable manner at a minimum of cost and so that the several parts are permanently aligned and fixed together requiring no further operation or adjustment.

In the form of the invention illustrated in Figs. 12 to 16, inclusive, we provide a form of construction applicable to a plate P of a fixture or the like, and the unit formed of mixing valve G', control valve L' and spout N' is joined by the tubes or conductors that extend between these parts, there being no housing such as is employed in the construction first described. Valve G' corresponds, generally, to valve G above described, valve L' corresponds to valve L above described, and spout N' corresponds to spout N above described. In this form of the invention there is a conduit K' corresponding to the conduit K above described, a conduit M' corresponding to the conduit M above described and conduit O' corresponding to the conduit O above described.

The valve G' instead of terminating or being closed at its lower end is provided with threads 100 at the lower end of body 32' suitable for making connection with a fluid supply pipe. The upper end portion of body 32' passes through the plate P and is threaded to carry retainer nuts 101 as clearly shown in Fig. 13. The body 60' of valve L' has its lower end threaded at 102 for connection with a supply pipe and it has its upper end extended and threaded to pass through the plate P and to carry clamp nuts 103. The spout N' is bonded to and supported by conduits M' and O' and it has a holder 82' passing through the plate and threaded to carry a clamp nut 110. A suitable shield 115 may be provided at the top of the plate P where the several parts above described pass through the plate.

The mixing valve G' has a chamber 41' in the rotatable core 33' and the body 32' has an inlet port 43' communicating with conduit K' and an outlet port 38' communicating with conduit M'. An outlet port 38'' is provided in the core to cooperate with port 38'. Port 38'' is movable relative to port 38' to control flow between the chamber 41' and port 38'. A recess or longitudinal port 120 is provided in one side of the core to be circumferentially spaced from port 38'' and extends longitudinally of the core so that it can be positioned to connect ports 43' and 38'. It is to be observed that a wall part 121 is left between ports 38'' and 120 and it is this wall portion which is varied as to position relative to port 38' to vary the mixture delivered to conduit M'. It is to be understood, of course, that the structure just described may include operating members 36' and 64' and various other parts such as seals and structural features corresponding to those incorporated in the structure first described.

Having described only typical preferred forms and applications of our invention, we do not wish to be limited or restricted to the specific details herein set forth, but wish to reserve to ourselves any variations or modifications that may appear to those skilled in the art and fall within the scope of the following claim.

Having described our invention, we claim:

A coupler for connecting a fluid handling unit and a supply pipe including, a cylindrical case fixed in the unit and having a side outlet, a plug rotatable in the case and having an eccentric pipe socket in one end and a pair of spaced heads having sealing engagement with the case at opposite sides of said outlet and forming a chamber passing fluid from the socket to said outlet.

LEO M. HARVEY.
HOMER M. HARVEY.

REFERENCES CITED

The following references are of record in the file of this patent:

UNITED STATES PATENTS

| Number | Name | Date |
|---|---|---|
| 531,585 | Cole | Dec. 25, 1894 |
| 925,436 | Kenly | June 15, 1909 |
| 1,601,979 | Norden | Oct. 5, 1926 |
| 1,664,901 | Rosenbaum | Apr. 3, 1928 |
| 1,730,455 | Glauber | Oct. 8, 1929 |
| 1,841,737 | Judell | Jan. 19, 1932 |
| 1,916,553 | Bersted | July 4, 1933 |
| 2,214,619 | Krieger | Sept. 10, 1940 |
| 2,309,900 | Herring | Feb. 2, 1943 |